United States Patent [19]

Faxvog

[11] 3,851,169

[45] Nov. 26, 1974

[54] APPARATUS FOR MEASURING AEROSOL PARTICLES

[75] Inventor: Frederick R. Faxvog, Rochester, Mich.

[73] Assignee: General Motors Corporation, Detroit, Mich.

[22] Filed: Nov. 23, 1973

[21] Appl. No.: 418,373

[52] U.S. Cl............... 250/222 PC, 235/92 PC
[51] Int. Cl. ............................................. G06m 7/00
[58] Field of Search............ 250/222 PC; 235/92 PC

[56] References Cited
UNITED STATES PATENTS

| | | | |
|---|---|---|---|
| 2,636,993 | 4/1953 | Jakobson | 235/92 PC |
| 3,153,727 | 10/1964 | Nathan | 235/92 PC |

*Primary Examiner*—James W. Lawrence
*Assistant Examiner*—T. N. Grigsby
*Attorney, Agent, or Firm*—Warren D. Hill

[57] ABSTRACT

A pair of laser beams intersect in a sampling zone containing an aerosol and each beam is focused by a lens to a small spot at the beam intersection so that the intersection defines a very small volume. Each beam is then magnified and imaged onto an aperture by an additional lens such that each aperture passes light from the central portion of its focal spot to a light detector. The output of one detector is fed to an analyzer which determines the extinction cross section of a particle passing through the small sampling volume and the other detector output is fed to a coincidence circuit in the analyzer to gate the signals from the first detector to allow registration by the analyzer of only those signals from particles passing through both beams in the small sampling volume.

3 Claims, 1 Drawing Figure

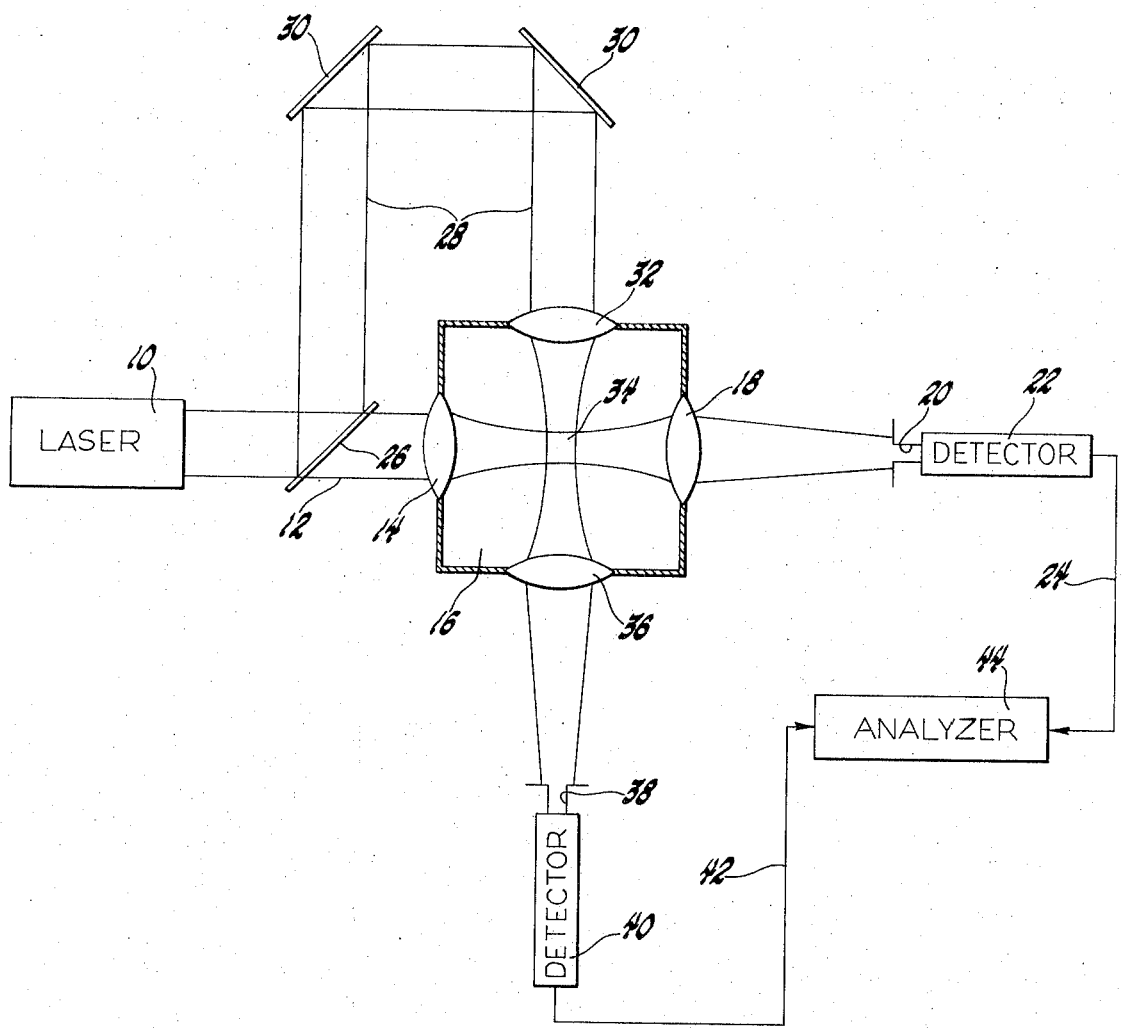

APPARATUS FOR MEASURING AEROSOL PARTICLES

This invention relates to apparatus for measuring the size of aerosol particles.

Heretofore, instruments have been available to measure particles carried by a gaseous media, however, those instruments have been limited to the measurement of particles greater than 0.5 micron diameter. It is desirable, however, in the examination of the particulate size distribution in automotive exhaust gases to measure much smaller particle sizes, especially for light absorbing particles which make up most of the exhaust particulates. Since nearly all the particulates in exhaust gases are smaller than 0.3 microns, it was necessary to provide new instrumentation for aerosol particle measurement. It has been found to be important to limit the sampling volume of the instrument to an extremely small size to achieve the accuracy and sensitivity needed for good measurements. There have been previous attempts to achieve a small sample volume such as by passing a narrow light beam through an aerosol which has been physically constrained into a very thin layer. However, in order to attain the small sampling volume, it is physically impractical to achieve a sufficiently thin layer of aerosol fluid.

It is therefore an object of this invention to provide an aerosol particle measuring instrument having an optically defined small sampling volume.

It is a further object of this invention to provide such an instrument capable of measuring aerosol particles of less than 0.5 microns.

The invention is carried out by providing a pair of light beams intersecting in an aerosol sample and lenses for focusing the beams to a very small focus spot at the point of intersection, a detector to sense extinction pulses in each beam caused by the passage of particles therethrough and an analyzer circuit for measuring the extinction pulses of one beam and a coincidence circuit for preventing registration of any pulse measurements other than those caused by particles in the small sampling volume. The invention further contemplates that an aperture in each light beam limits the light reaching the detector to that emanating from the central portion of the sampling volume to effectively reduce the effective sampling volume.

The above and other advantages will be made more apparent from the following specification taken in conjunction with the accompanying drawing which is a schematic diagram of apparatus for measuring aerosol particles according to the invention.

In the drawing a laser 10 such as a continuous wave mode-locked HeCd laser produces a first light beam 12 which is focused by a lens 14 to a small focal spot within a chamber 16 containing an aerosol under test. It is important to make the focal spot as small as possible consistent with the size of the particles to be measured in order to maximize the light intensity and to provide a large extinction pulse when a particle passes through the focal spot.

A second lens 18 aligned with the beam 12 magnifies the focal spot and projects an image thereof onto an aperture 20 and the light passing through the aperture is sensed by a photodiode detector 22 which produces analog output signals on line 24, which signals correspond to the extinction pulses caused by particles transversing the light beam. The purpose of the aperture 20 is twofold. Since a laser beam has a gaussian intensity distribution across its cross-section, it is desirable to eliminate the peripheral portions of the beam and to pass through the aperture only the central area of the beam which is the most intense and most nearly uniform part of the beam. Thus the detector 22 senses only that portion of the beam which has fairly uniform illumination thereby avoiding inaccurate readings which would otherwise be caused by extinction pulses from low intensity regions of the beam. The second purpose of the aperture is to further delineate the effective size of the focal spot to reduce the effective sampling volume.

A beam splitter 26 in the laser beam produces a second beam 28 which is reflected by a pair of mirrors 30 through a second focusing lens 32 which focuses the beam 28 at a second focal spot intersecting the focal spot of the first beam, the volume occupied in common by the central part of the two beams defining a sampling volume 34. A second imaging lens 36 magnifies the second focal spot and focuses its image onto an aperture 38 which passes the center part of the second beam to a photodiode detector 40; the lens 36 and the aperture 38 performing the same functions as the lens 18 and aperture 20 previously described. The photodiode detector 40 produces an output signal on line 42 corresponding to each extinction pulse caused by the passage of an aerosol particle through the second beam. A multi-channel analyzer 44 such as Hewlatt-Packard Model 5401B has an ADC (analog-to-digital conversion) input terminal connected to the line 24 and a gate input terminal connected to the line 42. The analyzer measures the amplitude of the extinction pulse signals carried by line 24 to determine the extinction cross-section of each particle giving rise to the pulse. The pulses may originate from a particle transversing portions of the beam outside the sampling volume 34 giving spurious values due to varying light intensity along the beam. In order to reject such pulses and to register only those which originated within the sample volume 34, a coincidence circuit within the analyzer 44 gated by signals on line 42 passes only those measured signals occurring coincidentally with the gating signals on line 42. Thus only those particles entering the sample volume 34 to simultaneously attenuate both light beams will be measured and registered by the analyzer 44.

Although a sample chamber 16 is provided for containing the aerosol, that element is optional since in some applications it is unnecessary that the aerosol be confined.

A specific example of the instrument is one where the laser beams are 1.5 mm in diameter and the focusing lenses 14 and 32, each having a focal length of 16 mm, focus the light beams to a focal spot 10 microns in diameter. The magnifying and imaging lenses 18 and 36 each have a focal length of 6.4 mm and a power of 25 X, and each aperture 20 and 38 has a 50 micron diameter. Thus the effective focal spot of each beam so far as the detectors are concerned is 2 microns in diameter. The effective sample volume 34 is then on the order of $8 \times 10^{-12}$ cm$^3$. With such an arrangement, it is feasible to measure aerosol containing $10^5$ to $10^6$ particles per cm$^3$. The instrument is capable of measuring extinction cross sections corresponding to particle diameters of 0.1 microns for non-light absorbing particles and 0.04 microns diameter for light absorbing particles. The upper limit of an accurate measure for absorbing particles is 0.4 microns diameter. While the range of instrument may be increased to cover larger particles by appropriate changes of the optical parameters, the low range recited here is of primary importance because it is a range not offered by other available instruments and it is the range of interest in the measure of aerosol particles in automotive exhausts.

The embodiment of the invention described herein is for purposes of illustration and the scope of the invention is intended to be limited only by the following claims:

What is claimed is:

1. Apparatus for measuring particle sizes in an aerosol comprising means for producing a first light beam, means for focusing the beam to a small focal spot within the aerosol, first detection means responsive to the beam for sensing the light intensity thereof and for determining the amplitude of extinction pulses produced by particles passing through the beam, and means for optically limiting the effective sampling volume of the apparatus including:

means for producing a second light beam intersecting the first beam at its point of focus, means for focusing the second beam to a second small focal spot at the intersection of the beams thereby defining a small sampling volume common to both beams, second detection means responsive to the second beam for sensing the light intensity thereof and for producing a gating pulse upon detection of an extinction pulse caused by particles passing through the second beam, and a coincidence circuit responsive to the extinction pulses of the first and second detection means for registering only those pulses from the first detection means corresponding to coincident pulses from the second detection means, whereby only those particles passing through the small sampling volume are ultimately measured and registered.

2. Apparatus for measuring particle sizes in an aerosol comprising means for producing a first light beam, means for focusing the beam to a small focal spot within the aerosol, first lens means for magnifying and imaging the focal spot of the first beam onto an image plane, a first aperture in the image plane for passing only the central portion of the focal spot, first detection means responsive to the beam for sensing the intensity of light passing through the aperture and for determining the amplitude of extinction pulses produced by particles passing through the beam, and means for optically limiting the effective sampling volume of the apparatus including:

means for producing a second light beam intersecting the first beam at its point of focus, means for focusing the second beam to a second small focal spot at the intersection of the beams thereby defining a small sampling volume common to both beams, second lens means for magnifying and imaging the focal spot of the second beam onto a second image plane, a second aperture in the second image plane for passing only the central portion of the second focal spot, second detection means responsive to the second beam for sensing the intensity of light passing through the second aperture and for producing gating pulses upon detection of an extinction pulse caused by particles passing through the second beam, and a coincidence circuit responsive to the extinction pulses of the first and second detection means for registering only those pulses from the first detection means corresponding to coincident gating pulses from the second detection means, whereby only those particles passing through the small sampling volume are ultimately measured and registered.

3. Apparatus for measuring particle sizes in an aerosol comprising laser means producing two light beams intersecting within the aerosol, lens means in each light beam for focusing each beam to a small focal spot at the intersection of the beams thereby defining a small volume of beam coincidence, aperture means in each beam for passing light only from the central area of each spot, detector means responsive to the light passed through each aperture for sensing the light intensity thereof, and for measuring the amplitude of extinction pulses produced by particles passing through one of the beams and for detecting the event of extinction pulses produced by particles passing through the other of the beams, and a coincidence circuit responsive to detected extinction pulses for registering only those measured pulse amplitudes from the one beam occurring in coincidence with extinction pulses from the other beam, whereby only those particles passing through the central portion of the small volume are utlimately measured and registered.

* * * * *